United States Patent
Ito

(10) Patent No.: US 7,527,135 B2
(45) Date of Patent: May 5, 2009

(54) MULTIPLATE FRICTION CLUTCH

(75) Inventor: Joji Ito, Fukuroi (JP)

(73) Assignee: NSK - Warner K.K., Tokyo (JP)

( * ) Notice: Subject to any disclaimer, the term of this patent is extended or adjusted under 35 U.S.C. 154(b) by 97 days.

(21) Appl. No.: 11/785,046

(22) Filed: Apr. 13, 2007

(65) Prior Publication Data

US 2007/0240965 A1    Oct. 18, 2007

(30) Foreign Application Priority Data

Apr. 14, 2006   (JP) ............................. 2006-112195

(51) Int. Cl.
*F16D 25/0638* (2006.01)
(52) U.S. Cl. ............................. 192/85 AA; 192/109 F
(58) Field of Classification Search ........................ None
See application file for complete search history.

(56) References Cited

U.S. PATENT DOCUMENTS 3,285,379 A * 11/1966 Helquist ................ 192/85 AA
6,817,460 B2  11/2004 Shoji et al.
6,892,869 B2   5/2005 Ookita et al.
2003/0188950 A1  10/2003 Kinoshita et al.

FOREIGN PATENT DOCUMENTS

JP     2003-301861 A   10/2003
JP     2004-144197 A    5/2004

* cited by examiner

*Primary Examiner*—Richard M. Lorence
(74) *Attorney, Agent, or Firm*—Crowell & Moring LLP

(57) ABSTRACT

A multiplate friction clutch can transmit power by pressing a stack of friction plates, which comprises plural separator plates and plural friction plates arranged alternately side by side, with a piston movable within a clutch casing. The multiplate friction clutch includes an annular holding groove formed in a pressing wall of the piston, a cushioning wave spring received in the holding groove, and an annular protuberance formed on an outer circumferential edge of an opening of the holding groove. The cushioning wave spring can be brought into resilient contact with one of the friction plates, which one friction plate is located adjacent to the piston. The annular protuberance prevents the wave spring from falling off the holding groove.

1 Claim, 8 Drawing Sheets

MULTIPLATE FRICTION CLUTCH

FIELD OF THE INVENTION

This invention relates to a multiplate friction clutch useful in an automatic transmission of an automotive vehicle.

BACKGROUND OF THE INVENTION

FIG. 1 is a cross-sectional view illustrating the basic construction of a multiplate friction clutch 10. FIG. 1 shows a clutch casing 1, a hub 2 as a counterpart element to which power is to be transmitted, and a piston 3 movable within the clutch casing 1. Designated at numerals 4 and 5 are separator plates and friction plates, respectively, which are arranged alternately side by side to make up a stack of friction plates. In the illustrated example, the separator plates 4 are in fitting engagement at outer circumferential portions thereof with spline grooves 11 in the clutch casing 1, and on the other hand, the friction plates 5 are in fitting engagement at inner circumferential portions thereof with spline grooves 21 in the hub 2.

When desired to engage the clutch, a hydraulic pressure is introduced into between the clutch casing 1 and the piston 3 through an oil hole 12. As a result, the piston 3 is pressed rightwards as viewed in the figure so that the stack of friction plates is pressed toward a backing plate 7. As the backing plate 7 is prevented from moving rightwards by a stopper ring 8, the clutch is brought into engagement. When desired to disengage the clutch, on the other hand, the hydraulic pressure is released. As a result, the piston 3 is allowed to return leftwards owing to the arrangement of a return spring 9.

Keeping in step with the recent move toward high-speed and high-power engines, it has become a practice to apply a cushioning resilient member to a piston on a surface thereof where the piston is brought into contact with an associated stack of friction plates. It was firstly contemplated to use a coned disk spring as a resilient member for relatively large loads. Specifically referring to FIG. 1, it was contemplated to form a holding groove 31 in a pressing wall of the piston 3 and to insert a coned disk spring in the holding groove 31.

In a high-torque-capacity clutch, however, an increase in the number of friction plates in a stack of friction plates leads to a greater overall clearance between the piston 3 and the backing plate 7. As the clutch is operated repeatedly, the wear of friction linings on the friction plates progresses, resulting in a still greater overall clearance. A potential problem, therefore, arises that the coned disk spring may fall off the holding groove when the clutch is not in operation. To avoid such a potential problem, it was proposed to form an annular protuberance on an edge of an opening of the holding groove and further, to form the coned disk spring in an elliptical shape (see JP-A-2004-144197).

When the holding groove is provided at the edge of its opening with the annular protuberance for the prevention of falling-off of the cushioning coned disk spring as mentioned above, the coned disk spring is required to ride over the annular protuberance upon mounting the coned disk spring on the piston. Formation of a cut in a coned disk spring may, however, structurally lead to a potential problem that, when pressed, the resulting coned disk spring may not be able to produce resiliency as much as it would do if the cut were not formed. The formation of such a cut further requires to form the coned disk spring in an elliptical shape and to fit the resulting elliptical coned disk spring in the holding groove while pressing the elliptical coned disk spring inwardly from both sides along a major axis into a shape close to a true circle. Moreover, after the mounting, the coned disk spring is in contact with the protuberance only at parts thereof in the direction of a minor axis.

As there is an ever-increasing demand for clutches of higher performance, it is required to mount a cushioning resilient member even on a clutch of relatively small torque capacity. In such a case, the use of a wave spring is suited. A wave spring allows to form a cut therein so that its handling is easier than a coned disk spring. The resulting wave spring with the cut formed therein is, however, accompanied by an inconvenience that under centrifugal force and vibrations, it has greater tendency of falling off the holding groove from the position of the cut.

BRIEF SUMMARY OF THE INVENTION

In one aspect of the present invention, there is thus provided a multiplate friction clutch for transmitting power by pressing a stack of friction plates, which comprises plural separator plates and plural friction plates arranged alternately side by side, with a piston movable within a clutch casing, comprising:

an annular holding groove formed in a pressing wall of the piston, a cushioning wave spring received in the holding groove such that the cushioning wave spring can be brought into resilient contact with one of the friction plates, said one friction plate being located adjacent to the piston, and an annular protuberance formed on an outer circumferential edge of an opening of the holding groove to prevent the wave spring from falling off the holding groove.

There is an outstanding desire for still further improvements in the performance of automatic transmission equipment for automotive vehicles. The arrangement of a spring on a pressing wall of a piston in a multiplate friction clutch makes it possible to reduce shift shocks. As this spring, it is desired to use a coned disk spring when relatively large loads are applied or a wave spring when small loads are applied. Depending on each automatic transmission equipment, either a coned disk spring or a wave spring can be used selectively. A wave spring permits easier mounting in a holding groove than a coned disk spring, as the wave sprig allows to form a cut therein.

The arrangement of the annular protuberance on the edge of the opening of the holding groove has made it possible to prevent the wave spring from falling off under centrifugal force and vibrations. The inclusion of the cut in the wave spring, however, involves a potential inconvenience that the wave spring may fall off from the position of the cut. However, the formation of the wave spring into a modified quadrilateral, cross-sectional shape corresponding to a cross-sectional shape of the annular protuberance can bring about a further advantage that the wave spring is rendered more resistant to falling-off.

DETAILED DESCRIPTION OF THE INVENTION

The wave-spring-holding groove formed in the pressing wall of the piston is provided on the outer circumferential edge of its opening with the annular protuberance having an inclined surface. Preferably, the wave spring can be formed in a modified quadrilateral, cross-sectional shape such that the wave spring is provided on an outer circumferential wall thereof with an inclined surface corresponding to the inclined surface of the annular protuberance. Owing to a contact between the inclined surface of the annular protuberance formed on the outer circumferential edge of the opening of the holding groove and the inclined surface of the outer circumferential wall of the wave spring, the wave spring is prevented from falling off the holding groove under centrifugal force and vibrations.

Figure 2:
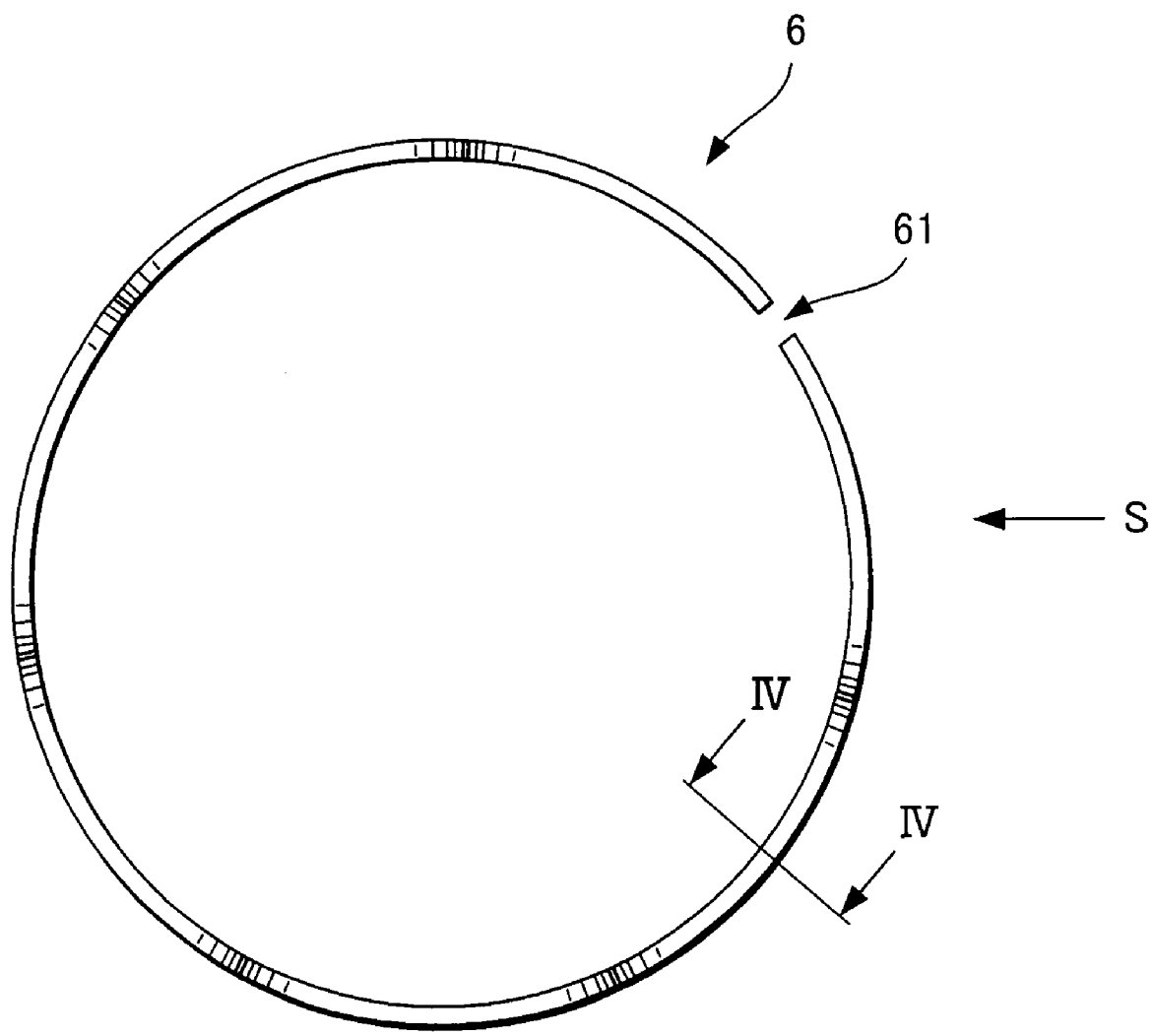
FIG. 2 is a front view of a conventional wave spring.
Figure 3:
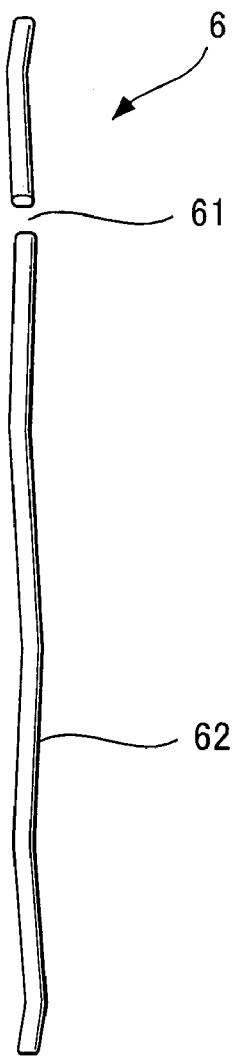
FIG. 3 is a side view of the wave spring as viewed in direction S in FIG. 2.
Figure 4:
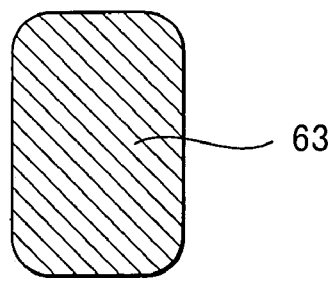
FIG. 4 is a cross-sectional view of the wave spring taken in the direction of arrows IV-IV of FIG. 2.
Figure 5:
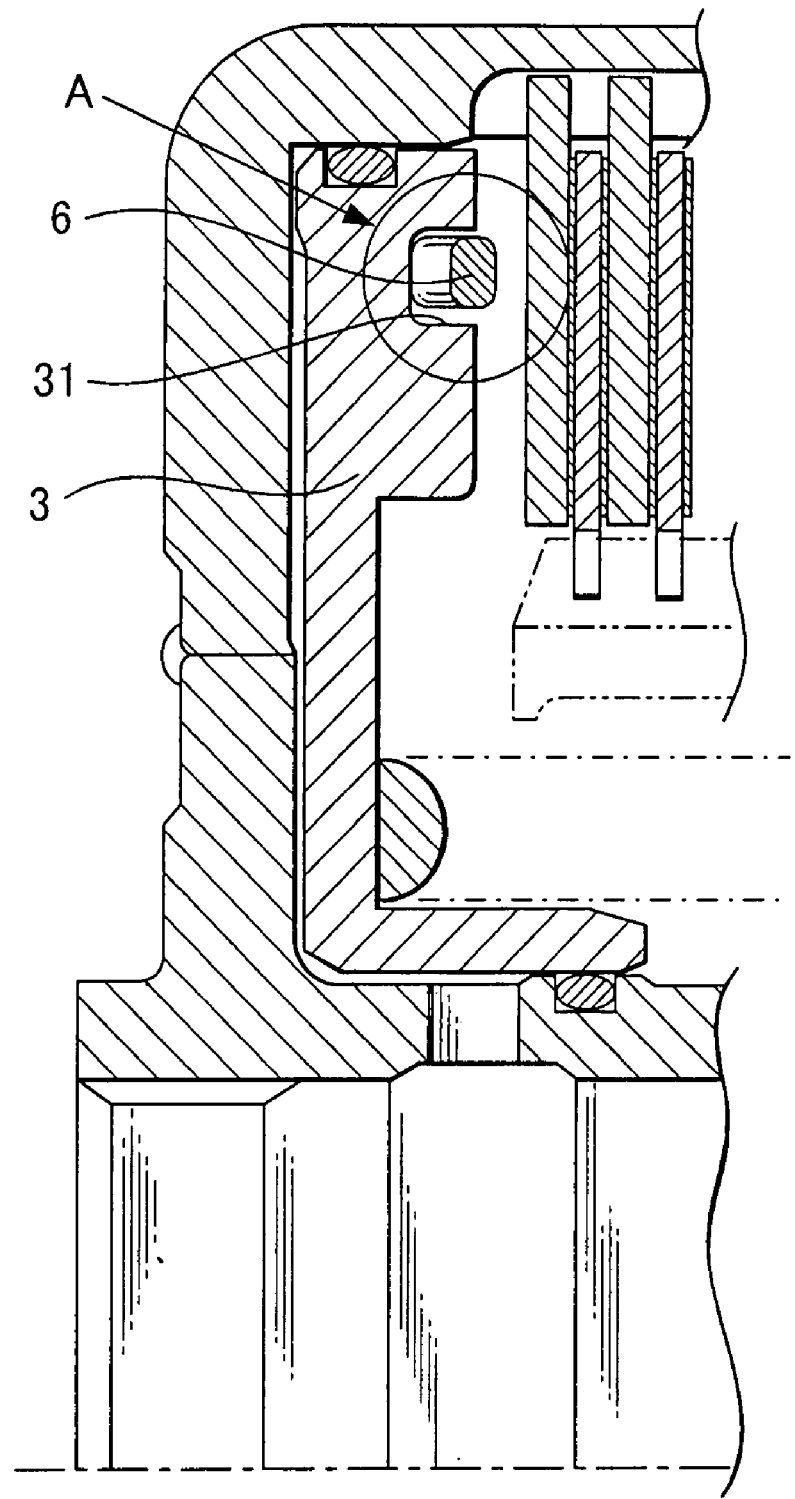
FIG. 5 is an enlarged fragmentary cross-sectional view of the multiplate friction clutch of FIG. 1.
Figure 6:
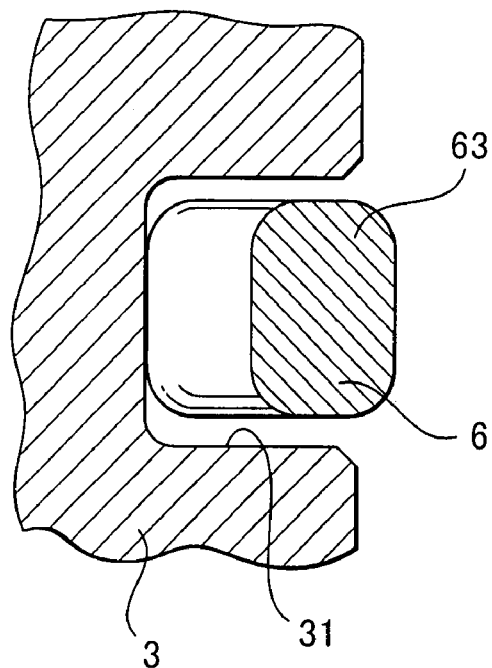
FIG. 6 is an enlarged cross-sectional view of an encircled part A of FIG. 5, and shows a relationship between the conventional wave spring and a holding groove.
Figure 7:
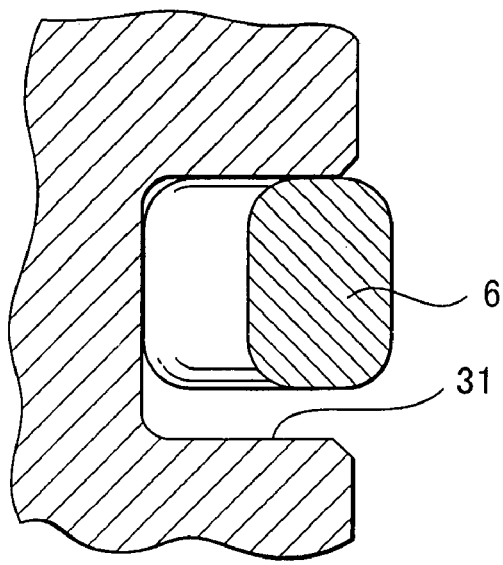
FIG. 7 is an enlarged cross-sectional view similar to FIG. 6, and illustrates effects of centrifugal force.
Figure 8:
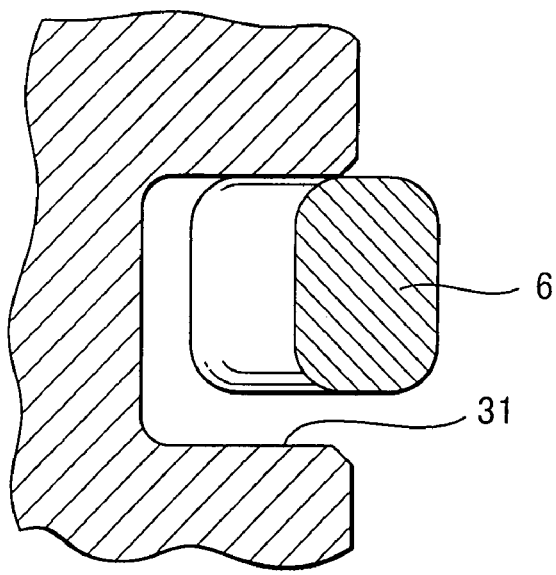
FIG. 8 is an enlarged cross-sectional view similar to FIG. 6, and depicts the position of the wave spring during a clutch operation.
Figure 9:
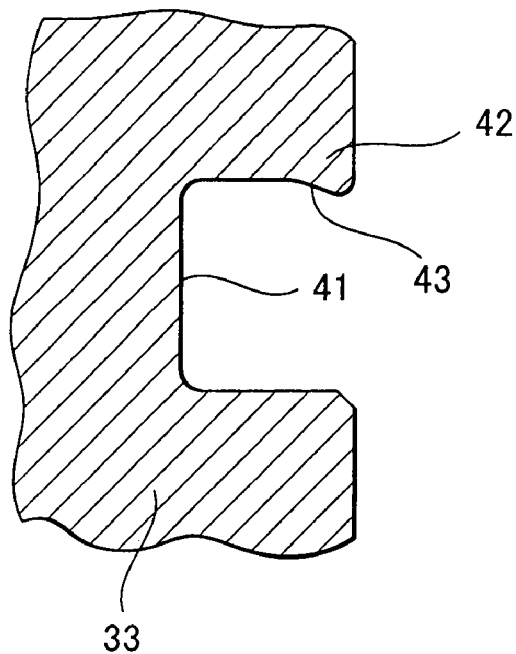
FIG. 9 is an enlarged fragmentary cross-sectional view illustrating a holding groove of a piston in a multiplate friction clutch according to an embodiment of the present invention.

FIGS. 2 to 4 show the wave spring 6, a cut 61 formed in the wave spring 6, a wave valley 62, and a cross-section 63 of the wave spring 6. FIGS. 6 to 8 illustrate on an enlarged scale an encircled part A of FIG. 5, where the wave spring 6 is received in the holding groove 31.

FIG. 6 illustrates the conventional wave spring 6 received in the holding groove 31 and having a rectangular cross-section as the cross-section 63. It is to be noted that the conventional wave spring 6 has been chamfered at and along all the corner edges thereof. When the clutch is in a non-operated state, the wave spring 6 is pressed under centrifugal force against an upper wall, that is, an outer circumferential wall of the holding groove 31, and assumes the position shown in FIG. 7. Under vibrations, the wave spring 6 then tends to gradually fall off the holding groove 31 as depicted in FIG. 8. After the wave spring 6 has fallen off the holding groove 31, the wave spring 6 is caused to fit into between the piston and the adjacent separator plate so that the clutch is brought into a continuously-engaged state. The automotive vehicle is hence rendered incapable of being shifted, thereby developing an inconvenience that friction linings on friction plates burn out.

It may be contemplated to make the peak of each wave higher for preventing the wave spring from falling off. This approach, however, leads to an increase in the depth of the holding groove 31. As a consequence, a piston having a greater thickness is required. The resulting clutch, therefore, has a greater overall axial length. This is certainly contrary to the requirement for a more compact clutch.

As the wave spring includes the cut, the wave spring is more susceptible to falling-off from the position of the cut.

FIGS. 9 to 12 are enlarged cross-sectional views similar to FIGS. 6 to 8, and show a holding groove 41 of a piston 33 in a multiplate friction clutch according to an embodiment of the present invention. The holding groove 41 formed in the piston 33 is provided on an outer circumferential edge of an opening thereof with an annular protuberance 42 having an inclined surface 43.

Figure 10:
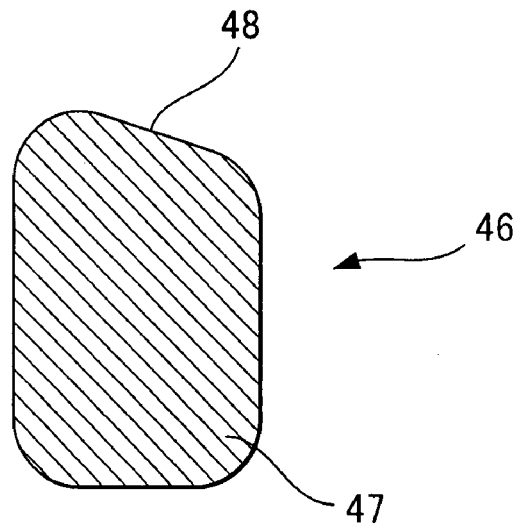
FIG. 10 is a cross-sectional view of the wave spring in the multiplate friction clutch according to the embodiment of the present invention.

FIG. 10 shows the cross-sectional shape of a wave spring 46 in the multiplate friction clutch according to the embodiment of the present invention. This wave spring 46 has a modified quadrilateral cross-section 47. Described specifically, the cross-section of the wave spring 46 is not a simple rectangular cross-section unlike the cross-section 63 of the conventional wave spring depicted in FIG. 4. The wave spring 46 is provided on the outer circumferential wall thereof with the inclined surface 48 which corresponds to the inclined surface 43 of the protuberance 42 on the outer circumferential edge of the opening of the holding groove 41. It is to be noted that the wave spring 46 has been chamfered at and along all the corner edges thereof.

Figure 11:
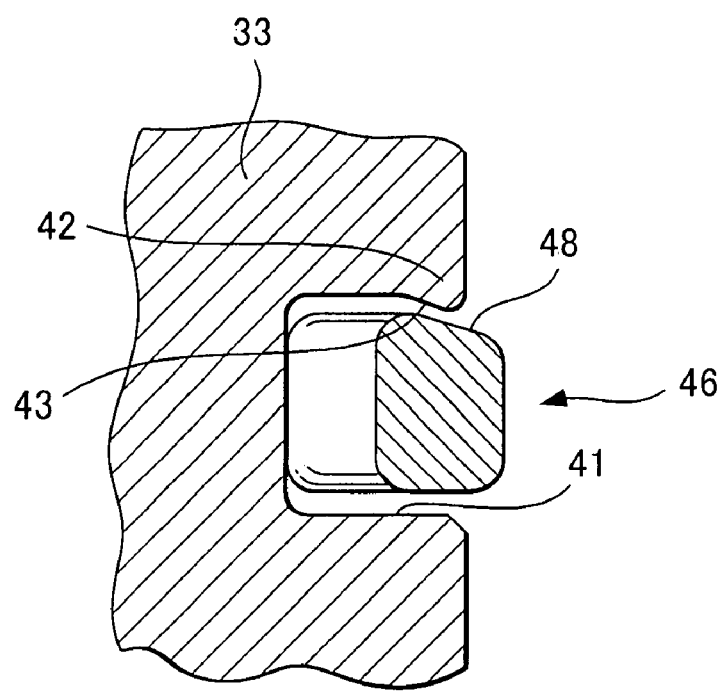
FIG. 11 is an enlarged fragmentary cross-sectional view showing a relationship between the wave spring and the holding groove in the multiplate friction clutch according to the embodiment of the present invention.

FIG. 11 illustrates the position of the wave spring 46 received in the holding groove 41 of the piston 33 when the clutch casing 1 (see FIG. 1) of the multiplate friction clutch according to the embodiment has not rotated yet.

Figure 1:
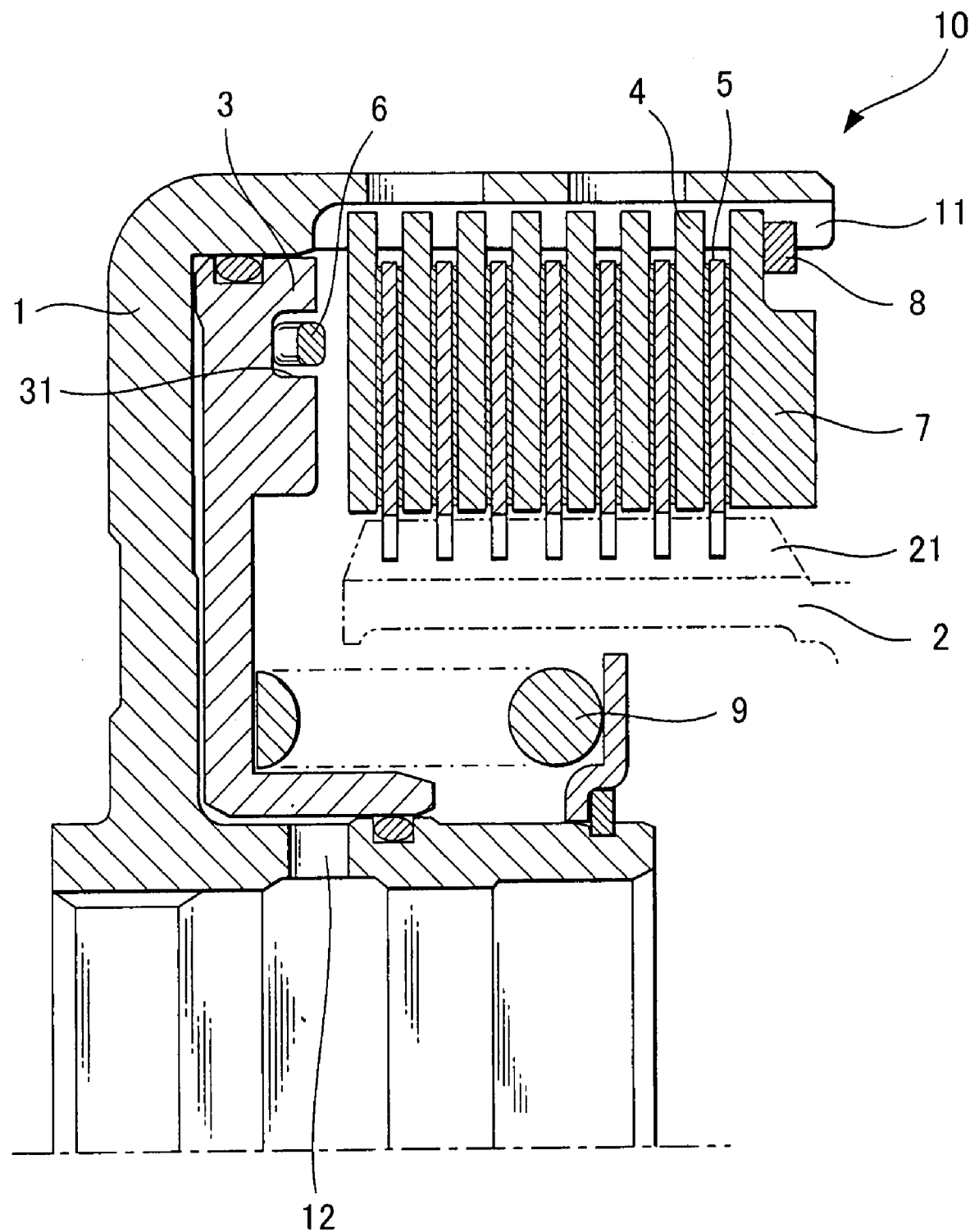
FIG. 1 is a cross-sectional view illustrating the basic construction of a multiplate friction clutch.
Figure 12:
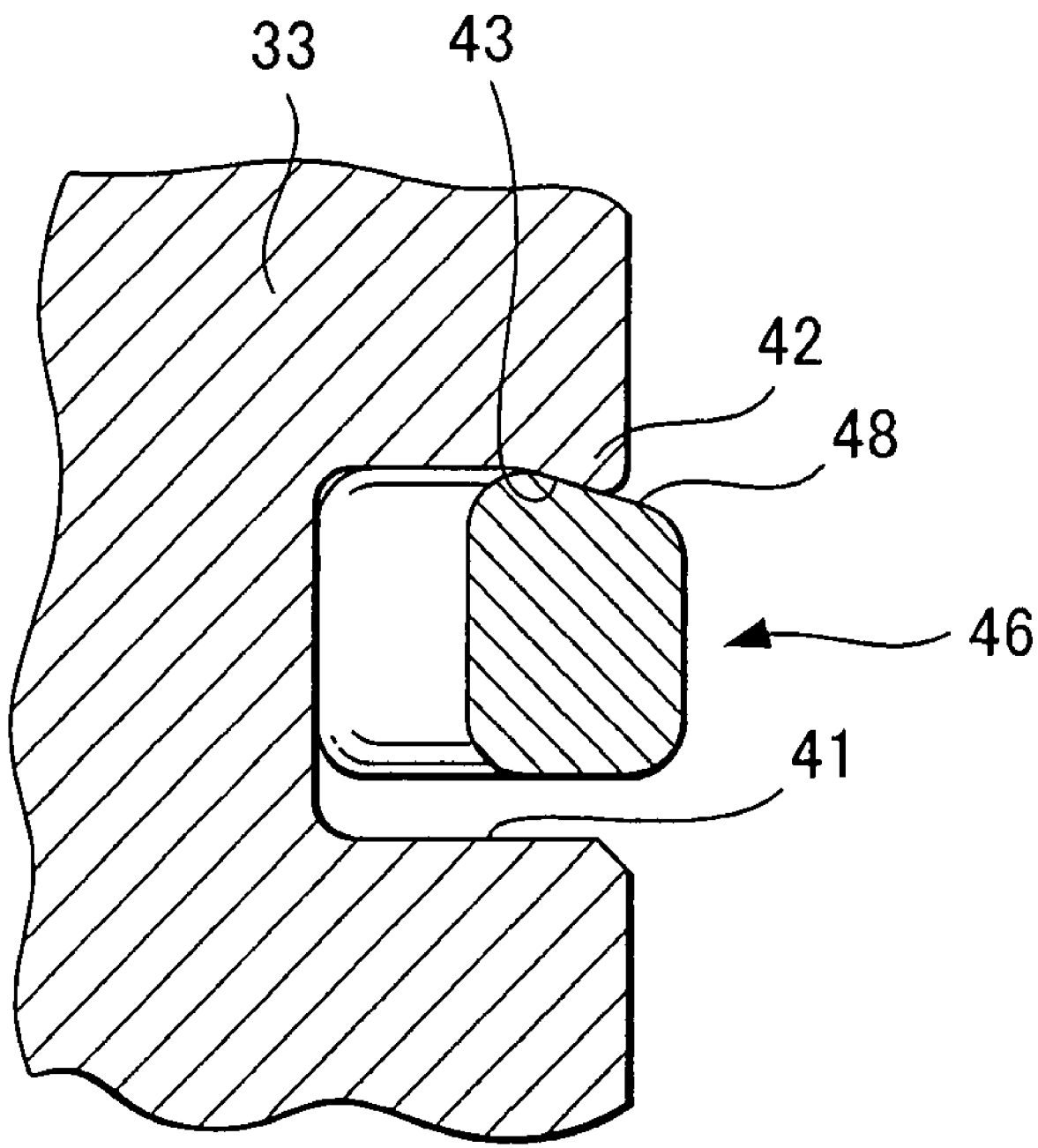
FIG. 12 is an enlarged cross-sectional view similar to FIG. 11, and depicts the position of the wave spring during an operation of the multiplate friction clutch according to the embodiment of the present invention.

FIG. 12 shows the position of the wave spring 46 when the clutch casing 1 is rotating but the separator plates 4 and the friction plates 5 have not engaged yet (see FIG. 1). The wave spring 46 is pressed under centrifugal force against the outer circumferential wall of the holding groove 41, and force is applied to the wave spring 46 in such a direction that the wave spring 46 may fall off the holding groove 41 under vibrations.

In the multiplate friction clutch according to this embodiment, the holding groove 41 is provided on the outer circumferential edge of its opening with the annular protuberance 42 having the inclined surface 43, and the wave spring 46 has the modified quadrilateral cross-section and is provided on the outer circumferential wall thereof with the inclined surface 48 corresponding to the inclined surface 43 of the annular protuberance 42. Even when the wave spring 46 becomes about to fall off under centrifugal force and vibrations, the contact of the inclined surface 48 with the inclined surface 43 can surely prevent the falling-off of the wave spring 46.

This application claims the priority of Japanese Patent Application 2006-112195 filed Apr. 14, 2006, which is incorporated herein by reference.

The invention claimed is:

1. A multiplate friction clutch for transmitting power by pressing a stack of friction plates, which comprises plural separator plates and plural friction plates arranged alternately side by side, with a piston movable within a clutch casing, comprising:

an annular holding groove formed in a pressing wall of said piston, a cushioning wave spring received in said holding groove such that said cushioning wave spring can be brought into resilient contact with one of said friction plates, said one friction plate being located adjacent to said piston, and an annular protuberance formed on an outer circumferential edge of an opening of said holding groove to prevent said wave spring from falling off said holding groove, wherein said wave spring has a modified quadrilateral, cross-sectional shape corresponding to a cross-sectional shape of said annular protuberance.

* * * * *